US010363621B2

(12) United States Patent
Hori et al.

(10) Patent No.: US 10,363,621 B2
(45) Date of Patent: Jul. 30, 2019

(54) COMBINED MACHINING TOOL AND MACHINING METHOD USING SAME

(71) Applicant: SUGINO MACHINE LIMITED, Uozu, Toyama (JP)

(72) Inventors: Tomoaki Hori, Toyama (JP); Tomoya Naito, Toyama (JP)

(73) Assignee: SUGINO MACHINE LIMITED, Uozu, Toyama (JP)

(*) Notice: Subject to any disclaimer, the term of this patent is extended or adjusted under 35 U.S.C. 154(b) by 50 days.

(21) Appl. No.: 15/532,912

(22) PCT Filed: Nov. 25, 2015

(86) PCT No.: PCT/JP2015/082984
§ 371 (c)(1),
(2) Date: Jun. 2, 2017

(87) PCT Pub. No.: WO2016/088614
PCT Pub. Date: Jun. 9, 2016

(65) Prior Publication Data
US 2017/0341171 A1    Nov. 30, 2017

(30) Foreign Application Priority Data

Dec. 5, 2014    (JP) ................................ 2014-246937

(51) Int. Cl.
*B23D 77/00*    (2006.01)
*B24B 39/02*    (2006.01)

(52) U.S. Cl.
CPC ........... *B23D 77/006* (2013.01); *B23D 77/00* (2013.01); *B24B 39/023* (2013.01);
(Continued)

(58) Field of Classification Search
CPC .. B23D 77/006; B23D 2277/14; B23D 77/06; B24B 39/023; Y10T 408/34; B23B 77/00; B23B 77/006
See application file for complete search history.

(56) References Cited

U.S. PATENT DOCUMENTS 3,795,957 A * 3/1974 Steusloff ........... B23B 29/03446
29/566
3,973,319 A * 8/1976 Klose ..................... B24B 39/023
72/71

(Continued)

FOREIGN PATENT DOCUMENTS

CN    102039524 A    5/2011
DE    682367 C * 10/1939 ........... B24B 39/023
(Continued)

OTHER PUBLICATIONS

International Search Report for PCT/JP2015/082984 dated Feb. 16, 2016.
(Continued)

*Primary Examiner* — Eric A Gates
(74) *Attorney, Agent, or Firm* — Merchant & Gould P.C.

(57) ABSTRACT

The burnishing part includes: a mandrel; burnishing rollers; a frame; an adjustment member that presses the frame axially from one end thereof to adjust the axial position of the frame with respect to the mandrel; and an elastic member that is arranged axially on the other side of the frame to support the frame. The reaming part includes: a base part that is detachably attached to the mandrel; and machining blades that are formed integrally with the base part. This results in providing a combined machining tool that is capable of machining an inner peripheral surface of a workpiece having a smaller diameter, and a machining method using the same.

9 Claims, 5 Drawing Sheets

(52) U.S. Cl.
CPC .... *B23D 2277/14* (2013.01); *B23D 2277/205* (2013.01); *Y10T 408/34* (2015.01); *Y10T 408/45* (2015.01)

(56) References Cited

U.S. PATENT DOCUMENTS

| | | | |
|---|---|---|---|
| 3,980,442 A | | 9/1976 | Riekeles |
| 4,040,765 A | * | 8/1977 | Vig .................. B23B 31/00 408/239 A |
| 4,054,976 A | * | 10/1977 | Ewald .................. B23B 51/08 29/90.01 |
| 4,133,089 A | | 1/1979 | Heymanns |
| 4,343,576 A | * | 8/1982 | Lagerholm ....... B23B 29/03457 408/155 |
| 4,367,576 A | * | 1/1983 | Dickinson ............... B24B 39/02 29/90.01 |
| 4,380,851 A | * | 4/1983 | Dickinson ............. B24B 39/023 29/90.01 |
| 4,425,693 A | * | 1/1984 | Dickinson ............. B24B 39/023 29/90.01 |
| 4,509,885 A | * | 4/1985 | Dickinson ............. B24B 39/023 29/90.01 |
| 4,527,929 A | * | 7/1985 | Dickinson ............. B24B 39/023 29/90.01 |
| 4,542,565 A | * | 9/1985 | Berstein ............... B24B 39/023 29/90.01 |
| 4,574,442 A | * | 3/1986 | Dickinson ............. B24B 39/023 29/90.01 |
| 9,033,770 B2 | * | 5/2015 | Miyauchi .......... B23B 29/03417 451/461 |
| 2004/0022594 A1 | | 2/2004 | Hecht |
| 2013/0089385 A1 | * | 4/2013 | Bozkurt .................. B23B 31/02 408/147 |

FOREIGN PATENT DOCUMENTS

| | | | | |
|---|---|---|---|---|
| DE | 923953 C | * | 2/1955 | ............ B24B 39/023 |
| DE | 2155434 A1 | * | 4/1973 | ............ B23B 41/16 |
| DE | 2223696 A1 | * | 11/1973 | ............ B23D 77/042 |
| GB | 191307410 A | * | 6/1914 | ............ B24B 39/023 |
| GB | 782859 A | * | 9/1957 | ............ B24B 39/023 |
| JP | S48-41259 Y1 | | 12/1973 | |
| JP | S64-20221 U | | 2/1989 | |
| JP | H6-39606 A | | 2/1994 | |
| JP | 2000-317828 A | | 11/2000 | |
| JP | 5352177 B2 | | 11/2013 | |
| JP | 2014-117773 A | | 6/2014 | |
| KR | 20050008774 A | | 1/2005 | |
| WO | WO-9505266 A1 | * | 2/1995 | ............ B23B 29/02 |

OTHER PUBLICATIONS

Office Action for Korean Patent Application No. 10-2017-7014989, dated May 9, 2018.

Office Action for Chinese Patent Application No. 201580065141.4, dated May 18, 2018.

* cited by examiner

COMBINED MACHINING TOOL AND MACHINING METHOD USING SAME

CROSS-REFERENCE TO RELATED APPLICATION

This application is a U.S. National Stage Application under 35 U.S.C § 371 of International Patent Application No. PCT/JP2015/082984 filed 25 Nov. 2015, which claims the benefit of priority to Japanese Patent Application No. 2014-246937 filed 5 Dec. 2014, the disclosures of all of which are hereby incorporated by reference in their entireties.

TECHNICAL FIELD

The present invention relates to a combined machining tool and a machining method using the same.

BACKGROUND OF THE INVENTION

A combined machining tool having capability of cutting and burnishing is known as a combined machining tool for machining the inner peripheral surface of a workpiece (see Japanese Patent No. 5352177, for example).

SUMMARY OF THE INVENTION

Problems to be Solved

Incidentally, the combined machining tool described in Japanese Patent No. 5352177 includes an adjustment mechanism of increasing or decreasing a cutting diameter. This mechanism adjusts a cutting diameter by moving a cartridge, to which a machining blade is fixed, radially closer to or away from the body of the combined machining tool.

However, installing such a mechanism of adjusting a cutting diameter in a combined machining tool will not only make the combined machining tool complicated but also result in increasing the diameter thereof to some extent. Accordingly, the combined machining tool described in Japanese Patent No. 5352177 has a problem that it will unlikely be used for machining an inner peripheral surface having a smaller diameter than a certain value.

The present invention has been made in view of the above-described circumstances to provide a combined machining tool that is capable of machining an inner peripheral surface of a workpiece having a smaller diameter, and a machining method using the same.

Solution to Problem

In order to solve the above-mentioned problem, a combined machining tool according to the present invention includes: a shank that has its rear end to be mounted on a processing machine; a burnishing part that is arranged on the shank and burnishes an inner peripheral surface of a workpiece; and a reaming part that is arranged in front of the burnishing part and executes reaming. The burnishing part includes: a mandrel that is fixed to the shank and has an outer peripheral surface in a tapered shape; rollers that are arranged on the outer peripheral surface of the mandrel; a frame that holds the rollers so as to be rollable on the outer peripheral surface of the mandrel; an adjustment member that presses the frame axially from one end thereof to adjust its axial position with respect to the mandrel; and an elastic member that is arranged axially on the other side of the frame to support the frame. The reaming part includes: a base part that is detachably attached to either the shank or a member which is connected to the shank; and machining blades that are formed integrally with the base part.

With this configuration, the base part of the reaming part formed integrally with the machining blade is detachably attached to either the shank or a member which is connected to the shank, to allow the combined machining tool to have a reduced diameter. Accordingly, the combined machining tool can ream and burnish an inner peripheral surface having a smaller diameter than a certain value in a single stroke of feeding operation, to accomplish high-speed mirror finishing. That is, a combined machining tool is provided that is capable of machining an inner peripheral surface of a workpiece having a smaller diameter.

In addition, the workpiece has its inner diameter slightly increased by the burnishing with the rollers, to allow for reducing scratches which are likely made at the time of removing the reamer and are inevitable with conventional reaming.

Further, even when the reaming capacity is reduced due to long usage of the reaming part to deteriorate the reaming level, the burnishing with the burnishing part allows for acquiring a certain level of finish surface quality (surface roughness). For this reason, the combined machining tool according to the present invention can extend (improve) the lifetime as a cutter, as compared with a conventional cutter of a reamer or the like.

Furthermore, the reaming is executed while a hole is held (guided) by the rollers, likely to improve the straightness of the reamed hole.

Moreover, any sludge to be disposed as industrial waste, such as with honing, is not generated.

Still moreover, the combined machining tool according to the present invention requires no special driving machine, and therefore can be used not only in a dedicated processing machine but also in a processing machine such as a conventional lathe and a machining center.

Note that in the combined machining tool, the base part of the reaming part may be detachably attached to the mandrel.

In the combined machining tool, the machining blade of the reaming part is preferably formed in a left-handed twist.

With this configuration, rotating the combined machining tool clockwise, facing forward, makes chips of the workpiece to be cut by the machining blades discharged in front of the combined machining tool because of the machining blades being formed in a left-handed twist. This allows the rollers to burnish the inner peripheral surface of the workpiece without contacting the chips. Accordingly, the inner peripheral surface of the workpiece has improved finish surface quality.

In the combined machining tool, the mandrel preferably has the outer peripheral surface in a tapered shape whose outer diameter increases rearward. Then, the adjustment member presses the frame axially from the rear end thereof to adjust its axial position, and the elastic member is preferably arranged in front of the frame.

With this configuration, during forward feeding, the reaming is executed by the reaming part and the burnishing is executed by the burnishing part, while during backward feeding, the roller diameter which is the diameter of a circle circumscribing the rollers is reduced to cause no burnishing to be executed. This allows the combined machining tool to ream and burnish the inner peripheral surface of the workpiece having a smaller diameter, through the forward feeding operation.

In the combined machining tool, the mandrel preferably has the outer peripheral surface in a tapered shape whose outer diameter increases frontward. Then, the adjustment member presses the frame axially from the front end thereof to adjust its axial position, and the elastic member is preferably arranged in the rear of the frame.

With this configuration, during forward feeding, the reaming is executed by the reaming part but no burnishing is executed because the roller diameter is reduced, while during backward feeding, the burnishing is executed by the burnishing part. This allows the combined machining tool to ream the inner peripheral surface of the workpiece having a smaller diameter through the forward feeding operation, while to burnish the same through the backward feeding operation.

In the combined machining tool, a machining-fluid supply passage for supplying machining fluid to the reaming part is preferably formed internally through the shank, the burnishing part, and the reaming part.

With this configuration, the machining fluid is more suitably supplied to the reaming part internally through the combined machining tool.

In order to solve the above-mentioned problem, a machining method according to the present invention uses a combined machining tool in which the mandrel has the outer peripheral surface in a tapered shape whose outer diameter increases rearward, the adjustment member presses the frame axially from the rear end thereof to adjust its axial position, and the elastic member is arranged in front of the frame. In this machining method, the adjustment member is used to adjust the axial position of the frame, in order to set the roller diameter, which is the diameter of a circle circumscribing the rollers, to be greater than the cutter diameter which is the outer diameter of the machining blades of the reaming part. Then, during forward feeding, the reaming is executed by the reaming part and the burnishing is executed by the burnishing part, while during backward feeding, the roller diameter is reduced to cause no burnishing to be executed.

With this configuration, reaming and burnishing the inner peripheral surface of the workpiece having a smaller diameter is executed through the forward feeding operation of the combined machining tool.

In order to solve the above-mentioned problems, a machining method according to the present invention uses a combined machining tool in which the mandrel has the outer peripheral surface in a tapered shape whose outer diameter increases frontward, the adjustment member presses the frame axially from the front end thereof to adjust its axial position, and the elastic member is arranged in the rear of the frame. In this machining method, the adjustment member is used to adjust the axial position of the frame, in order to set the roller diameter, which is the diameter of a circle circumscribing the rollers, to be greater than the cutter diameter which is the outer diameter of the machining blades of the reaming part. Then, during forward feeding, the reaming is executed by the reaming part but no burnishing is executed because the roller diameter is reduced, while during backward feeding, the burnishing is executed by the burnishing part.

With this configuration, reaming the inner peripheral surface of the workpiece having a smaller diameter is executed through the forward feeding operation of the combined machining tool, while the burnishing thereof is executed through the backward feeding operation of the combined machining tool.

Advantageous Effects of the Invention

The present invention provides a combined machining tool that is capable of machining an inner peripheral surface of a workpiece having a smaller diameter, and a machining method using the same.

DETAILED DESCRIPTION OF THE INVENTION

Embodiments of the present invention will be described in detail with reference to the drawings as appropriate.

Note that in the following drawings, the same or corresponding members are denoted by the same reference numerals, and duplicate descriptions thereof will be eliminated as appropriate. In addition, the size and shape of the members may schematically be represented by deformation or exaggeration for the purpose of illustration.

First Embodiment

Figure 1:
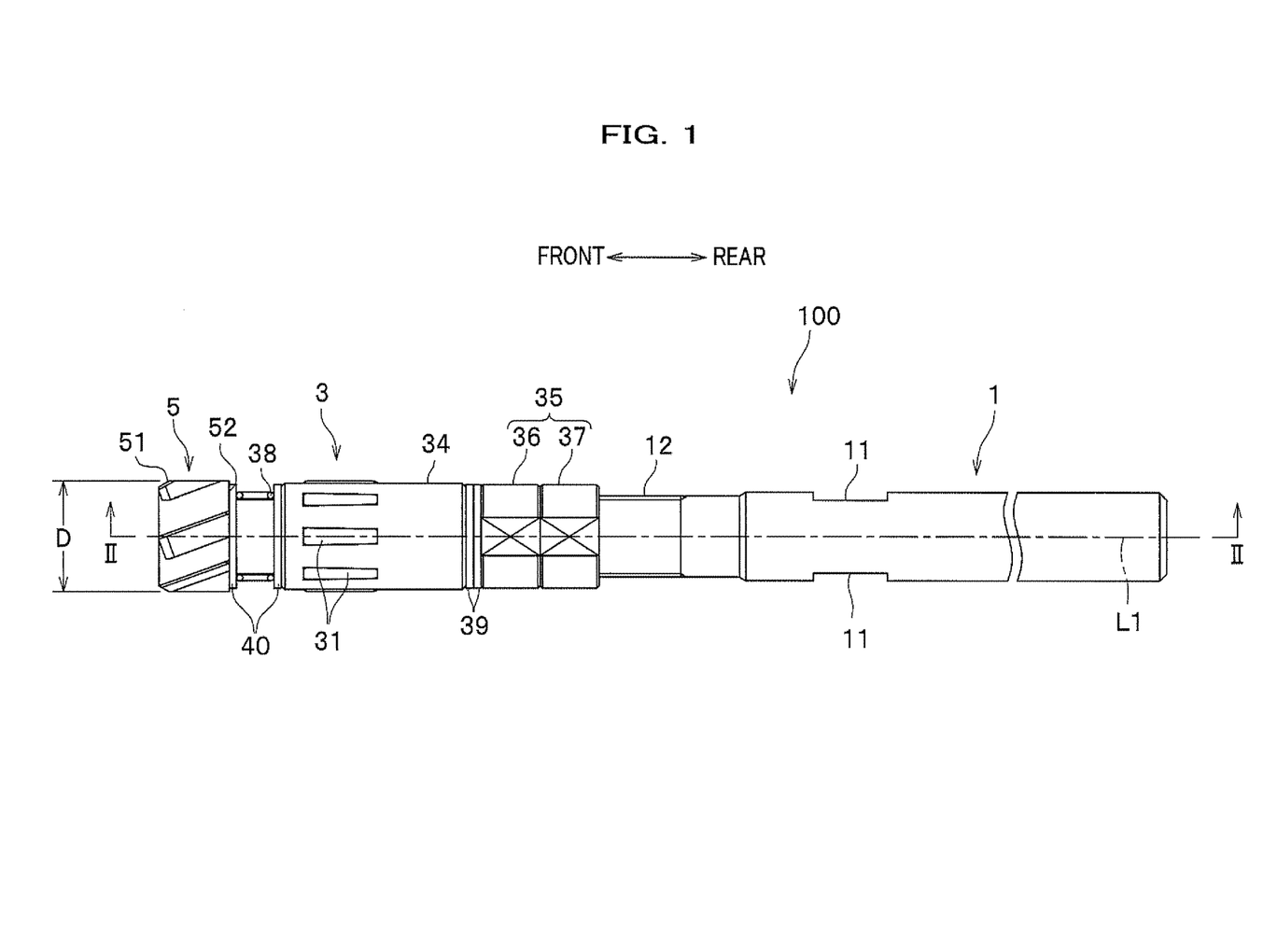
FIG. 1 is a side view of a combined machining tool according to a first embodiment of the present invention.
Figure 2:
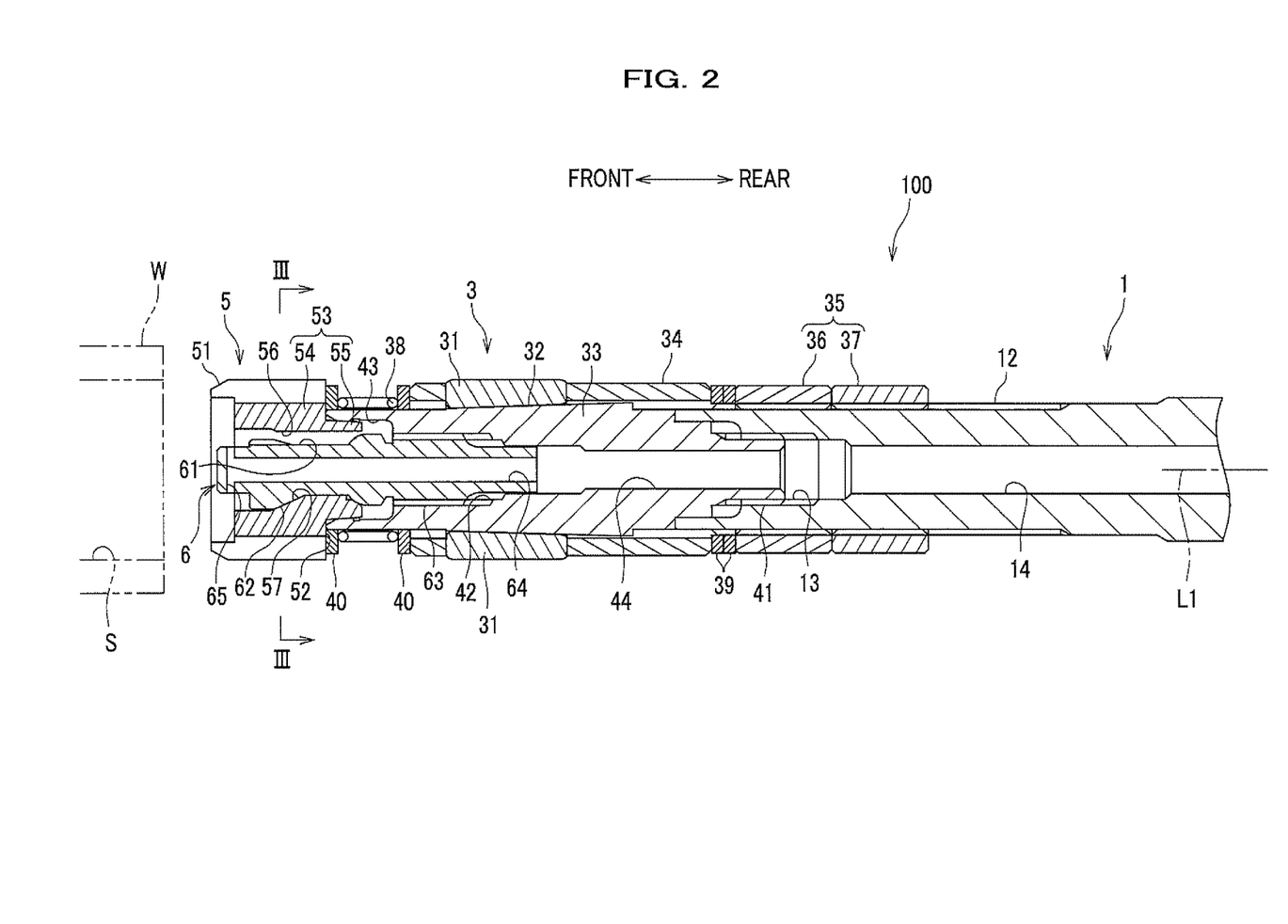
FIG. 2 is a cross-sectional view taken along a line II-II in FIG. 1.
Figure 3:
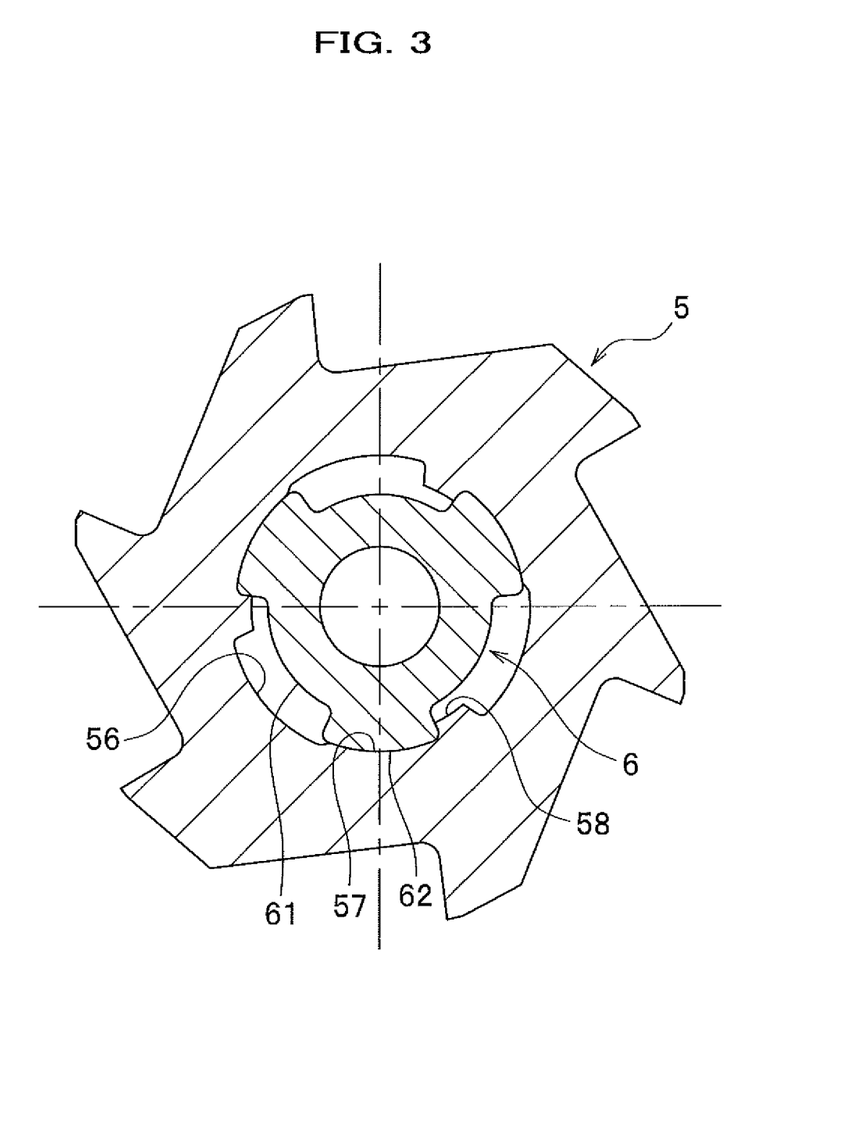
FIG. 3 is a cross-sectional view taken along a line III-Ill in FIG. 2.

FIG. 1 is a side view of a combined machining tool 100 according to a first embodiment of the present invention. FIG. 2 is a cross-sectional view taken along a line II-II in FIG. 1. FIG. 3 is a cross-sectional view taken along a line III-Ill in FIG. 2.

Note that for the purpose of illustration, the axial side of the combined machining tool 100 having a reaming part 5 will be referred to as "front," while the opposite side thereof will be referred to as "rear."

As shown in FIG. 1, the combined machining tool 100 according to the first embodiment of the present invention includes: a shank 1 that has its rear end to be mounted on a processing machine (not shown) and is rotated about a central axis L1; a burnishing part 3 that is arranged on the shank 1; and the reaming part 5 that is arranged in front of the burnishing part 3.

Both of the parts 3, 5 which are movable integrally with the shank 1 are arranged in series in the axial direction with respect to the shank 1. In the present Specification, it is assumed that the axial direction is a direction parallel to the center axial line L1, and the radial and circumferential directions are respective radial and circumferential directions about the center axis L1.

The shank 1 is formed on its outer peripheral surface with a two-faced anti-rotation part 11 as a pair of parallel surfaces for gripping and fixing the shank 1 so as not to be turned such as at the time of assembling the combined machining tool 100.

The burnishing part 3 burnishes an inner peripheral surface S of a workpiece W (hereinafter, see FIG. 2), and the reaming part 5 reams the inner peripheral surface S of the workpiece W. Here, the combined machining tool 100 is applied to machining an inner peripheral surface of a workpiece having such as a hollow part or a hole formed therein, and is preferably applied to machining the inner peripheral surface, particularly of a through hole formed in a workpiece. After the workpiece W is reamed by the reaming part 5, the workpiece W is burnished by the burnishing part 3.

In the first embodiment, the reaming is executed by the reaming part 5 and the burnishing is executed by the burnishing part 3 at the time of the combined machining tool 100 moving forward (during forward feeding).

The combined machining tool 100 is fed toward a feeding direction which is relatively in parallel to the center axis L1 with respect to the workpiece W in a cylindrical shape. Then, machining blades 51 of the reaming part 5 and burnishing rollers (rollers) 31 of the burnishing part 3 execute machining of the inner peripheral surface S of the workpiece W.

The workpiece W is a cylindrical member having a through hole, for example, and more specifically a cylinder of a hydraulic or pneumatic actuator, or a cylinder of a shock absorber, for example.

As shown in FIG. 2, the burnishing part 3 includes: a mandrel 33 that is fixed to the shank 1 and has an outer peripheral surface 32 in a tapered shape; the burnishing rollers 31 that are arranged on the outer peripheral surface 32 of the mandrel 33; and a frame 34 that holds the burnishing rollers 31 so as to be rollable on the outer peripheral surface 32 of the mandrel 33. Here, the number of the burnishing rollers 31 arranged is eight, but it can be changed as appropriate.

The mandrel 33 has a substantially cylindrical shape, and includes the outer peripheral surface 32 in a tapered shape whose outer diameter increases rearward. Here, the mandrel 33 is fixed to the front end of the shank 1 by screwing. A male screw part 41 is threaded on the outer peripheral surface at the rear end of the mandrel 33, while a female screw part 42 is threaded on the inner peripheral surface at the front end of the mandrel 33. The male screw part 41 of the mandrel 33 is screwed into a female screw part 13, which is threaded on the inner peripheral surface at the front end of the shank 1.

The frame 34 has a cylindrical shape and is arranged radially outside the outer peripheral surface 32 of the mandrel 33. The frame 34 is formed with through holes (eight holes here) for arranging the burnishing rollers 31 at regular intervals along the circumferential direction. The outer peripheral surface of each of the burnishing rollers 31 is in a tapered shape whose outer diameter decreases rearward, to have line contact with the outer peripheral surface 32 of the mandrel 33.

The burnishing part 3 includes: an adjustment member 35 that presses the frame 34 axially from the rear end thereof to adjust its axial position with respect to the mandrel 33; and an elastic member 38 that is arranged in front of the frame 34 to support the frame 34.

The adjustment member 35 includes a first adjustment nut 36 and a second adjustment nut 37 that are screwed into a male screw part 12 threaded on the outer peripheral surface at the front end of the shank 1. As the elastic member 38, a compression coil spring may be used, for example. Shim rings 40 are arranged axially at respective ends of the elastic member 38. The front end of the elastic member 38 is supported by a stepped end surface 52 of the reaming part 5 via the shim ring 40.

The first adjustment nut 36 is rotated to press the frame 34 via shim rings 39, for axially moving the frame 34 against an elastic force of the elastic member 38. Then, the second adjustment nut 37 is brought into contact with the first adjustment nut 36 for tightening, to fix the position of the adjustment member 35 for determining the axial position of the frame 34 with respect to the mandrel 33.

Using the adjustment member 35 to change the axial position of the frame 34 allows for adjusting the axial position of the burnishing roller 31 with respect to the mandrel 33 as well as changing the roller diameter which is a diameter of the circle circumscribing the burnishing rollers 31. That is, moving the frame 34 axially back and forth moves the burnishing rollers 31 axially along the outer peripheral surface 32 in a tapered shape of the mandrel 33, while moving the burnishing rollers 31 in the radial direction, in the through hole of the frame 34, allows for adjusting the roller diameter. Therefore, the adjustment member 35 can be used to adjust the diameter of the inner peripheral surface S after the burnishing.

During forward feeding, the frame 34 is moved rearward to the maximum by an elastic force of the elastic member 38 so as to be held at a position where the frame 34 abuts on the adjustment member 35 via the shim rings 39. In contrast, during backward feeding, the frame 34 is, along with the burnishing rollers 31, moved forward with respect to the mandrel 33 against the elastic force of the elastic member 38, by a frictional force generated when the burnishing rollers 31 come into contact with the inner peripheral surface S of the workpiece W.

The reaming part 5 includes: a base part 53 in a substantially cylindrical shape; and the machining blades 51 that are formed integrally with the base part 53 radially on the outer side thereof. The base part 53 consists of: a main body part 54 that is formed radially outside with the machining blades 51; and a cylindrical part 55 that continues to the rear of the main body part 54 and is fitted into a hole part 43 formed in the front end of the mandrel 33.

The base part 53 of the reaming part 5 is detachably attached to the mandrel 33, as a member connected to the shank 1, by a fixing bolt 6 in a state that the cylindrical part 55 is inserted in the hole part 43 of the mandrel 33.

As shown in FIGS. 2 to 3, the base part 53 of the reaming part 5 has first engaging parts 57 (three in this case), which protrude radially inward, formed on an inner peripheral surface 56 at regular intervals along the circumferential direction. In addition, a stopper 58 is arranged adjacent to one circumferential end of each of the first engagement parts 57. In contrast, the fixing bolt 6 has second engaging parts 62 (three in this case), which protrude radially outward, formed on an outer peripheral surface 61 at regular intervals along the circumferential direction. Further, the fixing bolt 6 has a male thread part 63 formed at an end (rear end).

At the time of attaching the reaming part 5 to the mandrel 33, the male screw part 63 of the fixing bolt 6 is first screwed slightly into the female screw part 42 of the mandrel 33. Subsequently, the reaming part 5 is axially moved in proximity to the fixing bolt 6, in a state that the first engaging part 57 of the reaming part 5 is shifted in the circumferential direction from the second engaging part 62 of the fixing bolt 6. Then, the two-faced anti-rotation part 11 of the shank 1 is gripped to avoid turning and a tool (not shown) is used to rotate the reaming part 5 clockwise so that the first engagement part 57 enters toward the rear of the second engaging part 62 to abut on the stopper 58. The reaming part 5 is further rotated clockwise to rotate the fixing bolt 6 together with the reaming part 5 so as to be screwed into the female screw part 42 of the mandrel 33, thereby causing the second engaging part 62 to press the first engaging part 57 so that the reaming part 5 is fixed and attached to the mandrel 33.

Here, the hole part 43 of the mandrel 33 has inside a tapered surface whose diameter decreases rearward, and the cylindrical part 55 of the base part 53 of the reaming part 5 has outside a tapered surface whose diameter decreases rearward. In addition, the tapered surface of the hole part 43 is made to have a slightly smaller diameter than the tapered surface of the cylindrical part 55, at an axial position where the stepped end face 52 of the reaming part 5 is aligned with the front end surface of the mandrel 33. Accordingly, the male screw part 63 of the fixing bolt 6 is screwed into the female screw part 42 of the mandrel 33, while the tapered surface of the cylindrical part 55 is press-fitted into the tapered surface of the hole part 43. As a result, a constraining force is generated to make the mandrel 33 coaxially aligned with the reaming part 5, thereby improving centering accuracy of the reaming part 5. Note that an annular groove is formed on the inner surface of the hole part 43 so as to facilitate elastic deformation toward a direction that the inner diameter of the hole part 43 expands when the cylindrical part 55 is press-fitted into the hole part 43. In addition, the reaming part 5 is attached to the mandrel 33 in a state that the stepped end surface 52 of the reaming part 5 is pressed against the front end surface of the mandrel 33 due to the male thread part 63 being screwed into the female thread part 42. As described above, the reaming part 5 contacts the mandrel 33 on two surfaces, the stepped end surface 52 and the tapered surface of the cylindrical part 55, so as to be constrained and therefore firmly fixed to the mandrel 33.

On the contrary, at the time of removing the reaming part 5 from the mandrel 33, the two-faced anti-rotation part 11 of the shank 1 is gripped to avoid turning, and the tool is used to rotate the reaming part 5 counterclockwise so that the first engaging part 57 is detached in the circumferential direction from the second engaging part 62. This allows the reaming part 5 to be removed from the mandrel 33. At this time, the male thread part 63 of the fixing bolt 6 remains slightly screwed to the female thread part 42 of the mandrel 33, to allow another reaming part to be subsequently attached to the mandrel 33. In this manner, the combined machining tool 100 facilitates replacing the reaming part 5.

Accordingly, a cutter diameter D (see FIG. 1), which is the outer diameter of the machining blades 51 of the reaming part 5, can be changed. The cutter diameter D of the reaming part 5 ranges from 15 to 25 mm, for example.

Note that in the present embodiment a so-called bayonet mechanism, which includes the first engagement part 57, the second engagement part 62, and the stopper 58, is used for fixing the reaming part 5 to the mandrel 33, but it is not limited thereto. For example, a common bolt may be used to fix the reaming part 5 to the mandrel 33.

As shown in FIG. 2, along the central axis L1, an axial hole 14 is formed in the shank 1, an axial hole 44 is formed in the mandrel 33, and an axial hole 64 is formed in the fixing bolt 6. In addition, radial holes 65 are formed in the fixing bolt 6 that communicate with the front end of the axial hole 64 and open to the outer peripheral surface. The axial holes 14, 44, 64 and the radial holes 65 are formed through the inside of the shank 1, the burnishing part 3, and the reaming part 5, to constitute a machining-fluid supply passage for supplying machining fluid to the reaming part 5.

Next, a description will be given of a machining method using the combined machining tool 100 configured as above, with reference to FIGS. 1 to 3.

In the combined machining tool 100, the reaming part 5 having the cutter diameter D, which corresponds to the inner peripheral surface S of the workpiece W to be machined, is first fixed and attached to the mandrel 33 with the fixing bolt 6. Here, any other reaming part already attached to the mandrel 33 will be replaced, Subsequently, the adjustment member 35 is used to adjust the axial position of the frame 34 so that the roller diameter, which is a diameter of the circle circumscribing the burnishing rollers 31, is set to be larger than the cutter diameter D which is the outer diameter of the machining blade 51 of the reaming part 5. The roller diameter is finely adjusted by loosening a second adjustment nut 37 and rotating a first adjustment nut 36, and is fixed by tightening the second adjustment nut 37.

Then, during forward feeding, in which the combined machining tool 100 rotationally driven by the processing machine moves forward while being rotated about the central axis L1, the machining blades 51 of the reaming part 5 ream the inner peripheral surface S of the workpiece W (see FIG. 2). At this time, the chips of the workpiece W cut by the machining blades 51 are discharged in front of the combined machining tool 100 because of the machining blades 51 being formed in a left-handed twist. In addition, the inner peripheral surface S of the workpiece W is burnished after the reaming by the burnishing part 3 in which the burnishing rollers 31 are held by the frame 34 staying at the position where the frame 34 has been moved rearward to the maximum by the elastic force of the elastic member 38.

Subsequently, during backward feeding, in which the combined machining tool 100 moves backward while being rotated so as to be removed from the workpiece W, what happens in the burnishing part 3 is that the burnishing rollers 31 contact the inner peripheral surface S of the workpiece W reamed by the reaming part 5 to cause the frame 34 to move forward with respect to the mandrel 33 together with the burnishing rollers 31 against the elastic force of the elastic member 38. As a result, the burnishing rollers 31 move radially inward within the through hole of the frame 34 to make the roller diameter reduced. Accordingly, no burnishing is executed. At this time, the workpiece W has its irregularities on the inner peripheral surface S crushed by the burnishing to make the inner diameter slightly (about 5 to 10 μm, for example) increased, thereby preventing the machining blade 51 from contacting the burnished inner peripheral surface S during backward feeding, and hence from scratching it.

As described above, in the present embodiment, the burnishing part 3 includes: the mandrel 33; the burnishing rollers 31; the frame 34; the adjustment member 35 that presses the frame 34 axially from one end thereof to adjust its axial position with respect to the mandrel 33; and the elastic member 38 that is arranged axially on the other side of the frame 34 to support the frame 34. The reaming part 5 includes: the base part 53 that is detachably attached to the mandrel 33; and the machining blade 51 that is formed integrally with the base part 53.

With this configuration, the base part 53 of the reaming part 5 formed integrally with the machining blade 51 is detachably attached to the mandrel 33, to allow the combined machining tool 100 to have a reduced diameter. Accordingly, the combined working tool 100 reams and burnishes the inner peripheral face S having a smaller diameter than a certain value in a single stroke of feeding operation, to accomplish high-speed mirror finishing. That is, the combined machining tool 100 is provided that is capable of machining the inner peripheral surface S of the workpiece W having a smaller diameter.

In addition, the workpiece W has its inner diameter slightly increased by the burnishing with the burnishing rollers 31, to allow for reducing scratches which are likely made at the time of removing the reamer and are inevitable with conventional reaming.

Further, even when the reaming capacity is reduced due to long usage of the reaming part 5 to deteriorate the reaming level, the burnishing with the burnishing part 3 allows for acquiring a certain level of finish surface accuracy (surface roughness). For this reason, the combined machining tool 100 according to the present embodiment can extend (improve) the lifetime as a cutter, as compared with a conventional cutter of a reamer or the like.

Furthermore, the reaming is executed while the hole is held (guided) by the burnishing rollers 31, likely to improve the straightness of the reamed hole.

Moreover, any sludge to be disposed as industrial waste, such as with honing, is not generated.

Still moreover, the combined machining tool 100 according to the present embodiment requires no special driving machine, and therefore can be used not only in a dedicated processing machine but also in a processing machine such as a conventional lathe and a machining center.

In addition, in the present embodiment, the machining blade 51 of the reaming part 5 is formed in a left-handed twist. With this configuration, rotating the combined machining tool 100 clockwise, facing forward, discharges the chips of the workpiece W to be cut by the machining blades 51 in front of the combined machining tool 100 because of the machining blades 51 being formed in the left-handed twisted. This allows the burnishing rollers 31 to burnish the inner peripheral surface S of the workpiece W without contacting the chips. Accordingly, the inner peripheral surface S of the workpiece W has improved finish surface accuracy.

Further, in the present embodiment, the mandrel 33 has the outer peripheral surface 32 in a tapered shape whose outer diameter increases rearward, the adjustment member 35 presses the frame 34 axially from the rear end thereof for adjustment, and the elastic member 38 is arranged in front of the frame 34. With this configuration, during forward feeding, the reaming is executed by the reaming part 5 and the burnishing is executed by the burnishing part 3, while during backward feeding, the roller diameter which is the diameter of a circle circumscribing the burnishing rollers 31 is reduced to cause no burnishing to be executed. This allows the combined machining tool 100 to ream and burnish the inner peripheral surface S of the workpiece W having a smaller diameter, through the forward feeding operation.

Furthermore, in the present embodiment, a machining-fluid supply passage for supplying machining fluid to the reaming part 5 is formed internally through the shank 1, the burnishing part 3, and the reaming part 5. With this configuration, the machining fluid is more suitably supplied to the reaming part 5 internally through the combined machining tool 100.

Second Embodiment

Next, a description will be given of a combined machining tool 100a according to a second embodiment, with reference to FIGS. 4 to 5, focusing on differences from the first embodiment, and descriptions of the same will be omitted as appropriate.

Figure 4:
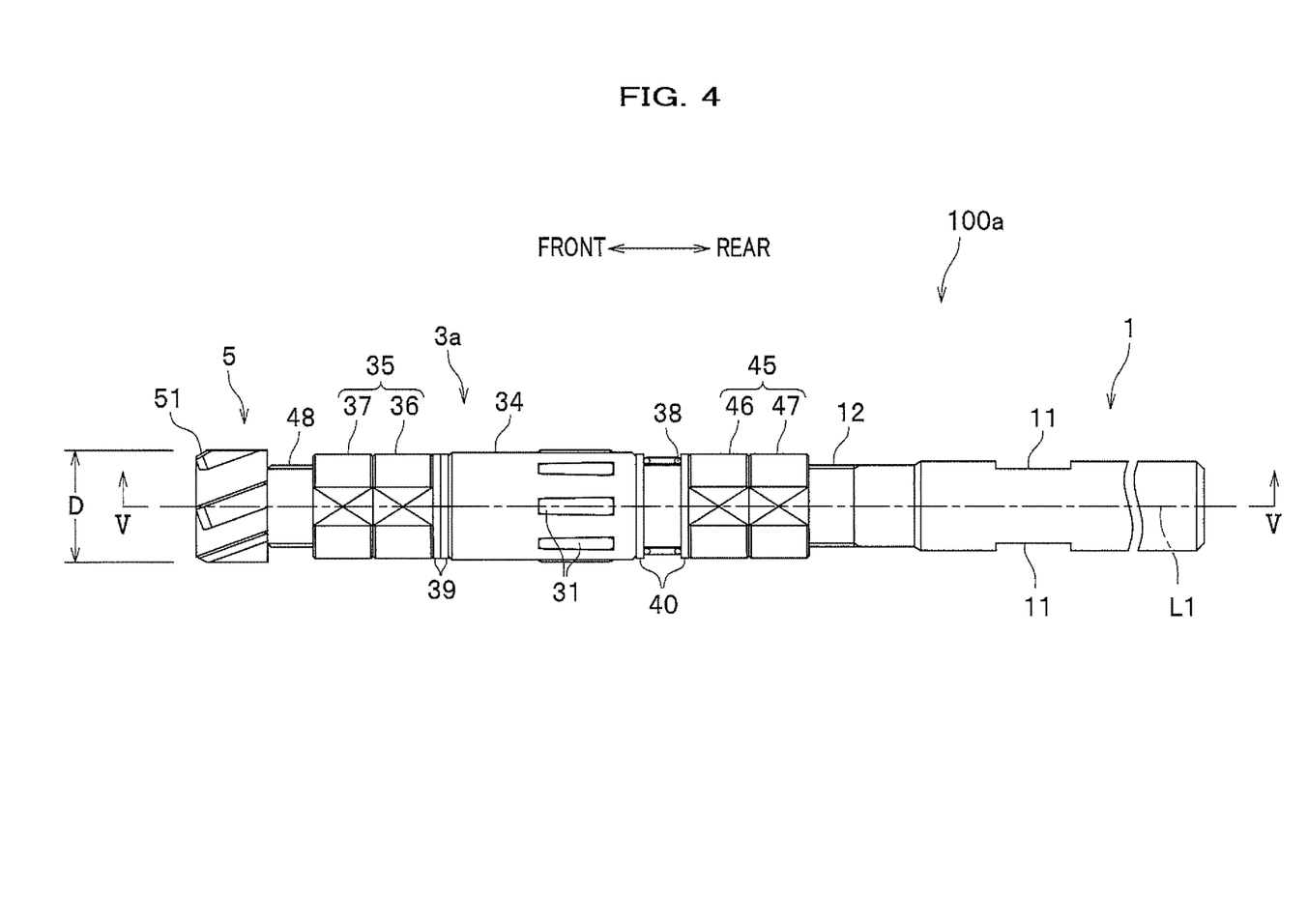
FIG. 4 is a side view of a combined machining tool according to a second embodiment of the present invention.

FIG. 4 is a side view of the combined machining tool 100a according to the second embodiment of the present invention. FIG. 5 is a cross-sectional view taken along a line V-V in FIG. 4.

Figure 5:
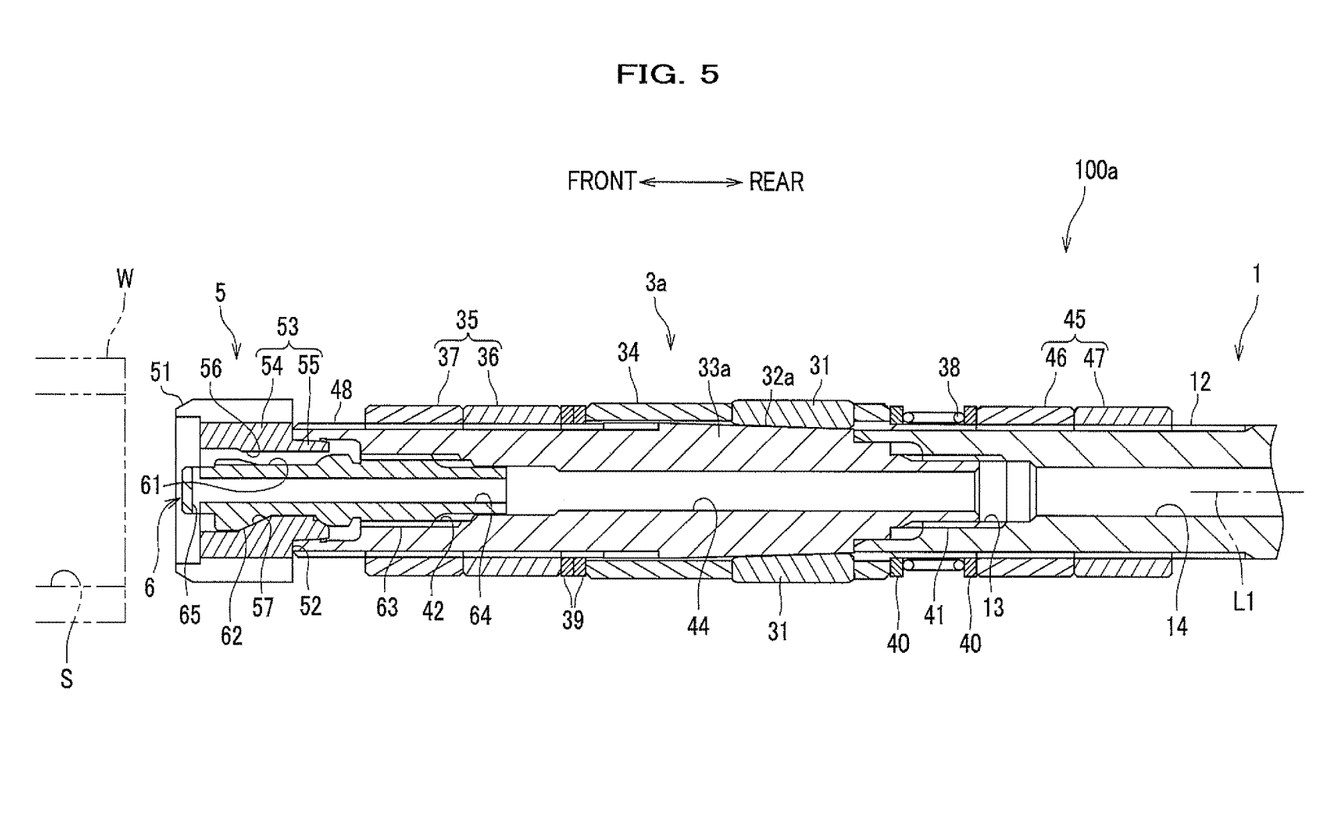
FIG. 5 is a cross-sectional view taken along a line V-V in FIG. 4.

As shown in FIGS. 4 to 5, in the second embodiment, the reaming is executed by the reaming part 5 at the time of the combined machining tool 100a moving forward (during forward feeding), and then the burnishing is executed by a burnishing part 3a at the time of the combined machining tool 100a moving backward (during backward feeding).

A mandrel 33a has a substantially cylindrical shape, and an outer peripheral surface 32a of the mandrel 33a has a tapered shape whose outer diameter increases frontward. Here, the mandrel 33a is fixed to the front end of the shank 1 by screw fastening. In addition, the mandrel 33a has the male screw part 41 formed on the outer peripheral surface at the rear end, has the female screw part 42 formed on the inner peripheral surface at the front end, and has a male screw part 48 formed on the outer peripheral surface at the front end.

Here, the frame 34 is the same member as the first embodiment, but is arranged so that the front and rear are reversed. In addition, the burnishing rollers 31 here are also the same members as the first embodiment, but are arranged so that the front and rear are reversed. Accordingly, the outer peripheral surface of the burnishing rollers 31 has a tapered shape whose outer diameter decreases frontward.

In addition, the burnishing part 3a includes: the adjustment member 35 that presses the frame 34 axially from the front end thereof to adjust its axial position with respect to the mandrel 33a; and the elastic member 38 that is arranged in the rear of the frame 34 to support the frame 34. The adjustment member 35 includes the first adjustment nut 36 and second adjustment nut 37 that are screwed into the male screw part 48 threaded on the outer peripheral surface at the front end of the shank 1. Here, the same members as in the first embodiment are also used as the adjustment member 35 and elastic member 38, but the axial positions thereof are reversed with respect to the frame 34.

The rear end of the elastic member 38 is supported by a support member 45 via the shim ring 40. The support member 45 includes a first support nut 46 and a second support nut 47 that are screwed into the male screw part 12 threaded on the outer peripheral surface at the front end of the shank 1. Then, the second support nut 47 is abutted on the first support nut 46 and tightened to fix the axial position of the support member 45.

During forward feeding, the frame 34 is moved backward with respect to the mandrel 33 against the elastic force of the elastic member 38, together with the burnishing rollers 31, by the frictional force generated when the burnishing rollers 31 contact the inner peripheral surface S of the workpiece W. In contrast, during backward feeding, the frame 34 is moved forward to the maximum by the elastic force of the elastic member 38 so as to be held at a position where it abuts on the adjustment member 35 via the shim rings 39.

In the case of using the combined machining tool 100a as configured above, the inner peripheral surface S of the workpiece W (see FIG. 5) is reamed during forward feeding by the machining blades 51 of the reaming part 5. Additionally, in the burnishing part 3a, the frame 34 is moved rearward with respect to the mandrel 33a against the elastic force of the elastic member 38, together with the burnishing rollers 31, due to the contact between the inner peripheral surface S of the workpiece W reamed by the reaming part 5 and the burnishing rollers 31. As a result, the burnishing rollers 31 moves radially inward within the through hole of the frame 34 to have the roller diameter reduced. Accordingly, no burnishing is executed.

Subsequently, during backward feeding, the inner peripheral surface S of the workpiece W is burnished after the reaming by the burnishing part 3a in which the burnishing rollers 31 are held by the frame 34 staying at the position where the frame 34 has been moved frontward to the maximum by the elastic force of the elastic member 38. At this time, the workpiece W has its irregularities on the inner peripheral surface S crushed by the burnishing to slightly increase the inner diameter, thereby preventing the machining blades 51 from contacting the burnished inner peripheral surface S during backward feeding.

As described above, in the second embodiment, during forward feeding, the reaming is executed by the reaming part 5 but no burnishing is executed because the roller diameter is reduced, while during backward feeding, the burnishing is executed by the burnishing part 3a. This allows the combined machining tool 100a to ream the inner peripheral surface S of the workpiece W having a smaller diameter through the forward feeding operation, while to burnish the same through the backward feeding operation. In addition, the machining conditions can be set for each of the reaming and the burnishing to allow each processing to be executed under optimum conditions.

Hereinabove, the present invention has been described based on the embodiments, but the present invention is not limited to the configurations described in the above embodiments and may be modified as appropriate within the scope not departing from the spirit thereof, inclusive of suitably combining or selecting the configurations described in the above embodiments. Additionally, the configurations in the above embodiments may partly be added, deleted, or replaced.

For example, in the above-described embodiments, the mandrel 33 or 33a is fixed to the front end of the shank 1 by screw fastening, but the present invention is not limited thereto. For example, the mandrel 33 or 33a may be arranged radially outside the shank 1 and fixed to the shank 1 such as by a key. In this case, the base part 53 of the reaming part 5 can detachably be attached to the shank 1.

LEGEND OF NUMERICAL SIGNS

1 Shank
3, 3a Burnishing part
5 Reaming part
6 Fixing bolt
14, 44, 64 Axial hole (Machining-fluid supply passage)
31 Burnishing roller (roller)
32, 32a Outer peripheral surface
33, 33a Mandrel
34 Frame
35 Adjustment member
38 Elastic member
51 Machining blade
53 Base part
65 Radial hole (Machining-fluid supply passage)
100, 100a Combined machining tool
D Cutter diameter
S Inner peripheral surface
W Workpiece

What is claimed is:

1. A combined machining tool comprising:
   a shank that has its rear end to be mounted on a processing machine;
   a burnishing part that is arranged on the shank and burnishes an inner peripheral surface of a workpiece; and
   a reaming part that is arranged in front of the burnishing part and executes reaming wherein the burnishing part comprises:
   a mandrel that is fixed to the shank and has an outer peripheral surface in a tapered shape;
   rollers that are arranged on the outer peripheral surface of the mandrel;
   a frame that holds the rollers so as to be rollable on the outer peripheral surface of the mandrel;
   an adjustment member that presses the frame axially from one end thereof to adjust its axial position with respect to the mandrel; and
   an elastic member that is arranged axially on the other side of the frame to support the frame, and
   wherein the reaming part comprises:
   a base part that is detachably attached to either the shank or a member which is connected to the shank; and
   a machining blade that is formed integrally with the base part,
   wherein a hole part is formed in either the shank or the member which is connected to the shank, to have inside a tapered surface whose diameter decreases rearward, and a cylindrical part is formed in the base part so as to be fitted into the hole part, to have outside a tapered surface whose diameter decreases rearward, so that the diameter of the tapered surface of the hole part is smaller than that of the tapered surface of the cylindrical part.

2. The combined machining tool according to claim 1, wherein the machining blade of the reaming part is formed in a left-handed twist.

3. The combined machining tool according to claim 1, wherein
   the mandrel has the outer peripheral surface in a tapered shape whose outer diameter increases rearward,
   the adjustment member presses the frame axially from the rear end thereof to adjust its axial position, and
   the elastic member is arranged in front of the frame.

4. The combined machining tool according to claim 3, wherein
   a machining-fluid supply passage for supplying machining fluid to the reaming part is formed internally through the shank, the burnishing part, and the reaming part.

5. A machining method using the combined machining tool according to claim 3, the method comprising:
   using the adjustment member to adjust the axial position of the frame, in order to set the roller diameter, which is the diameter of a circle circumscribing the rollers, to be greater than the cutter diameter which is the outer diameter of the machining blade of the reaming part; and
   during forward feeding, executing the reaming by the reaming part and executing the burnishing by the burnishing part, while during backward feeding, executing no burnishing because the roller diameter is reduced.

6. The combined machining tool according to claim 1, wherein
   the mandrel has the outer peripheral surface in a tapered shape whose outer diameter increases frontward,
   the adjustment member presses the frame axially from the front end thereof to adjust its axial position, and
   the elastic member is arranged in the rear of the frame.

7. The combined machining tool according to claim 6, wherein
a machining-fluid supply passage for supplying machining fluid to the reaming part is formed internally through the shank, the burnishing part, and the reaming part.

8. A machining method using the combined machining tool according to claim 6, the method comprising:
using the adjustment member to adjust the axial position of the frame, in order to set the roller diameter, which is the diameter of a circle circumscribing the rollers, to be greater than the cutter diameter which is the outer diameter of the machining blade of the reaming part; and
during forward feeding, executing the reaming by the reaming part but executing no burnishing because the roller diameter is reduced, while during backward feeding, executing the burnishing by the burnishing part.

9. The combined machining tool according to claim 1, wherein
a machining-fluid supply passage for supplying machining fluid to the reaming part is formed internally through the shank, the burnishing part, and the reaming part.

* * * * *